Feb. 16, 1960

L. EULER 2,925,161

CENTRIFUGALLY ACTUATED FRICTION CLUTCH

Filed April 30, 1957

INVENTOR
L. Euler
ATTORNEYS

Feb. 16, 1960 L. EULER 2,925,161
CENTRIFUGALLY ACTUATED FRICTION CLUTCH
Filed April 30, 1957 2 Sheets-Sheet 2

INVENTOR
*L. Euler*

BY *Jeserek Downing Deebold*
ATTORNEYS

United States Patent Office 2,925,161
Patented Feb. 16, 1960

2,925,161

CENTRIFUGALLY ACTUATED FRICTION CLUTCH

Luis Euler, Havana, Cuba, assignor of fifty percent to Tomas Galdos, Havana, Cuba Application April 30, 1957, Serial No. 656,086

1 Claim. (Cl. 192—105)

The present invention relates to positive clutches particularly suited to be used in association with automatic variable speed transmissions of motor vehicles, although well adapted for use in mechanisms concerned with power transmission and where automatic clutching operations are necessary. In automatic variable speed transmissions of the planetary type for automotive vehicles, the speed ratio changes are generally obtained by engaging two elements of a planetary gearing, with said elements rotating at different speeds for unitary rotation of the complete gearing, or by braking one element of the planetary gearing to produce a definite gear reduction between the other two elements. These clutching or braking operations of the elements of the planetary gearing are usually effected by control arrangements subjected to the speed of the engine or to the speed of the vehicle. In planetary transmissions heretofore provided, it has been considered necessary to employ complicated hydro-mechanical or electro-mechanical means for the proper functioning of such a transmission.

My invention provides a simple mechanical speed responsive device which may be used equally well as a clutch or as a brake, capable of substituting advantageously for the previously mentioned hydro-mechanical or electro-mechanical means. Specifically the invention relates to clutches of the friction type, the friction clutch means being actuatable by mechanical pressure due to centrifugal force.

One object of the invention is to provide a clutch mechanism in which the friction elements of a member rotating at any angular speed, and the friction elements of another member rotating at any other angular speed, may be brought into engagement for unitary rotation of both members in response to a predetermined minimum angular speed of a third member.

Another object of the invention is to provide a clutch mechanism in which the friction elements of a stationary member and the friction elements of a rotating member may be brought into engagement to arrest motion of the rotating member in response to a predetermined minimum angular speed of a third member.

Another object of the invention is to provide a clutch mechanism in which the rate of the clutch engaging pressure may be made to vary according to any suitable function of the angular speed of a third member.

Another object of the invention is to provide a clutch mechanism in which axial forces between the rotating members are entirely eliminated throughout clutching operations, thereby avoiding complicated thrust bearings and elaborated parts subjected to wear. The absence of such thrust bearings in the present mechanism, permits a simple mechanical construction eliminating also friction between its movable parts.

A further object is to incorporate the centrifugal mechanism within the friction clutch assembly affording a construction more compact as well as simpler than presently centrifugal clutch mechanisms employed for similar purposes.

Novel features of construction will be apparent upon consideration of the embodiments thereof and with reference to the illustrations of the included drawings in which.

Figure 2:
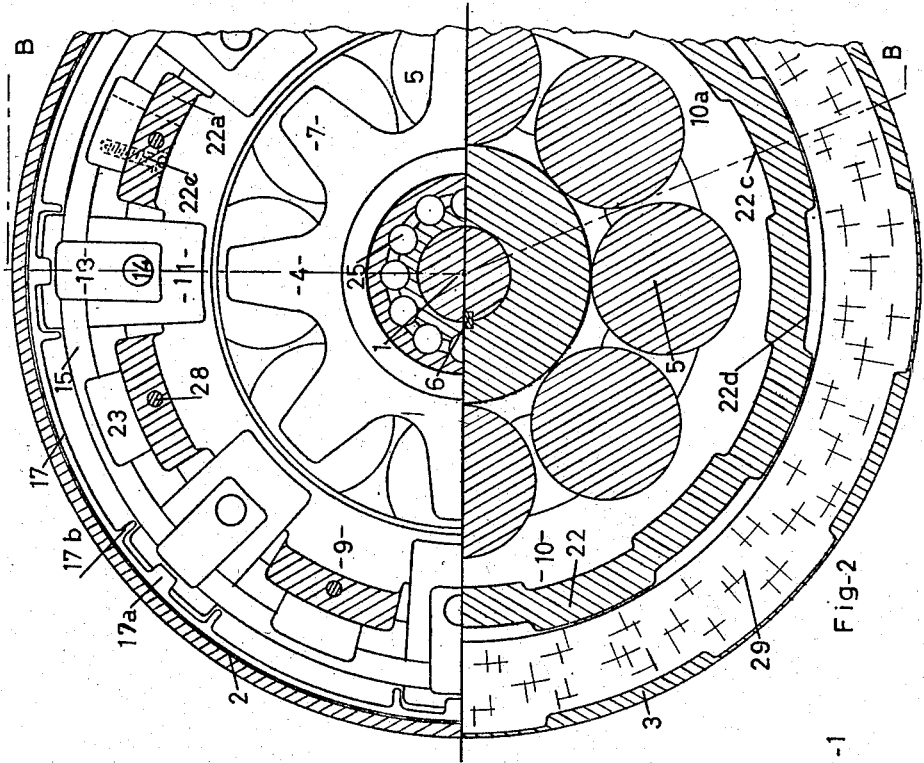
Fig. 2 is a cross-sectional view taken on the broken line A—A of Fig. 1 with portions thereof taken away to show details of the mechanism.

In these drawings the reference character 1 indicates a shaft driven by any conveniently controlled source of power (not shown) and rotatably mounted on both ends in the antifriction bearings 25 and 25a. Secured to shaft 1 by key 6 is a ball impeller 4 comprising two series of spokes 7 and 7a with innerly formed radial grooves 8 and 8a respectively. Encased within the impeller 4 between oppositely faced grooves 8 and 8a are the spherical balls 5 which are relative to the impeller, fixed in axial and circumferential directions but radially displaceable.

The bearing 25a is mounted in the integral formed coupling plate 3a of the drum 3 which has circumferentially spaced slots 3b adapted to engage the friction discs 29 which have interfitting salient portions at their outer peripheries.

Bearing 25 is mounted in the integral formed coupling plate 2a of the drum 2. The cylinder 22 has circumferentially spaced slots 22d and 22c at its outer and inner peripheries respectively, and laterally expanding spaced jaws 22a and 22b to which are securely fastened by means of screws 22c the series of supporters 23 and 24 respectively. The cylinder 22 is fixedly attached to the drum 2 by means of the bolts 28 screwed to the jaws 22a.

The pressure plates 17 and 18 and the friction discs 30 have salient portions at their inner peripheries adapted to be engaged with the interfitting slots 22d at the outer periphery of the cylinder 22. Two cylindrical sections 9 and 10 circumscribing concentrically the ball impeller 4 are axially displaceable having salient portions at their outer peripheries adapted to be engaged with the interfitting slots 22e at the inner periphery of the cylinder 22. The before mentioned cylindrical sections 9 and 10 have conical surfaces formed at their inner peripheries providing a pair of raceways 9a and 10a upon which the spherical balls 5 may roll.

The two series of swinging plates 11 and 12 are radially disposed and clamped to the thrust rings 15 and 16 respectively by the leaf springs 13 which are fastened to the plates 11 and 12 by means of the rivets 14. The lower tips of the series of plates 11 bear against the cylindrical section 9 and the upper tips against the pressure plates 17. Also the lower tips of the series of plates 12 bear against the cylindrical section 10 and the upper tips against the pressure plate 18. Both series of plates 11 and 12 are held in position by the salient guides 17b and retained within the hooks 17a formed integral with the pressure 17 and 18.

Operation

Figure 1:
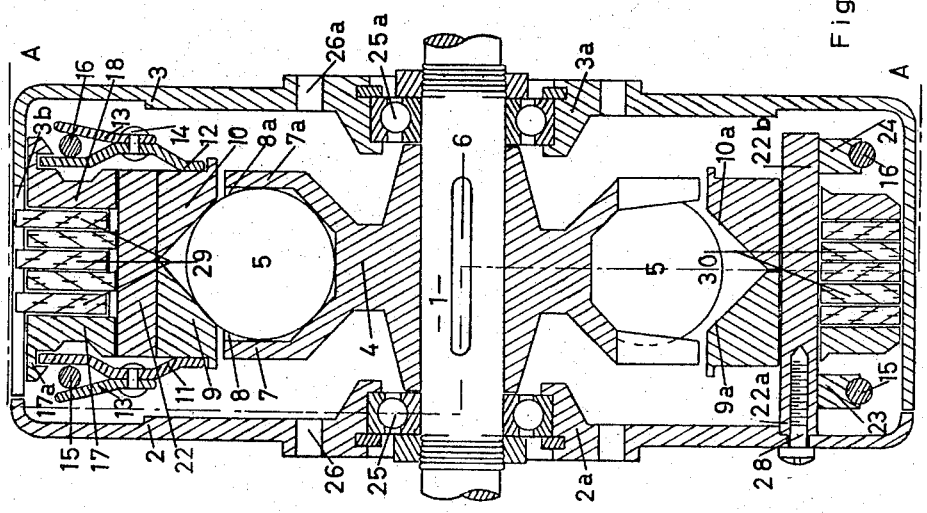
Fig. 1 is a longitudinal section through the clutch mechanism unit taken on line B—B of Fig. 2.

The operation of this mechanism will best be understood by assuming that the shaft 1 will be connected at either end to a source of power capable of rotating said shaft at any convenient angular speed and momentarily at rest. Further it is assumed that the clutch member or drum 2 will be connected mechanically to a shaft, gear or pulley (not shown) through the agency of the integral formed coupling plate 2a and rotated at any angular speed. Also, clutch member or drum 3 will be connected mechanically to another shaft, gear or pulley (not shown) and rotated at any other angular speed. If now shaft 1 is rotated slowly, the spherical balls 5 carried by the impeller 4 will also be rotated at the same angular speed. Under the influence of the centrifugal force the balls 5 will move along the radial grooves 8 and 8a of the impeller 4 and forced to bear and roll upon the frusto-conical surfaces 9a and 10a causing the balls 5 to spin about an axis formed by the spherical portions of them contained within the radial grooves 8a and 8 thereby reducing the friction to a minimum. Each of the balls 5 will have two angular contact points, one with each of the surfaces 9a and 10a and will follow a circular path on said surfaces. The force exerted by the balls 5 against the inclined surfaces 9a and 10a will have two axial components tending to move the axially displaceable members 9 and 10 in opposite direction. Referring to Fig. 1 it will be noted that if the lower parts of the swinging plates 11 are deviated from right to left, the plain surfaces of the plates 11 bearing against the lateral arc portions of the thrust ring 15, will rock about the extreme points of the arc subtended by the widths of the plates 11 and diverge at the central parts, thereby deflecting the leaf springs 13, which will always tend to position the plain surfaces of the plates 11 in a plane parallel to the plane which contains the thrust ring 15. If the angular speed of the shaft 1 is increased conveniently, the axial forces exerted by the balls 5 against the inclined surfaces 9a and 10a will move the cylindrical members 9 and 10 axially outwards together with the lower tips of the swinging plates 11 and 12 against the action of the leaf springs 13. At the same time the upper tips of the plates 11 and 12 will swing inwardly causing the pressure plates 17 and 18 to engage the interleaving friction discs 29 and 30, thereby connecting the two clutch drums 2 and 3 together. If now the angular speed of the shaft 1 is decreased sufficiently, the plates 11 and 12 on account of the leaf springs 13 will push the conical members 9 and 10 inwardly and pull by means of the hooks 17a, the pressure plates 17 and 18 outwardly thereby disengaging the friction discs 29 and 30 releasing the clutch drums 2 and 3.

It should be noted that the engagement of the clutch drums 2 and 3 depends solely upon the speed of the ball impeller 4. Therefore, it is immaterial which one of the clutch drums 2 or 3 is used as an input or as an output member. Moreover, both clutch drums 2 and 3 may be used as input members or as output members according to the modus operandi of the device to which the clutch drums are connected.

Figure 3:
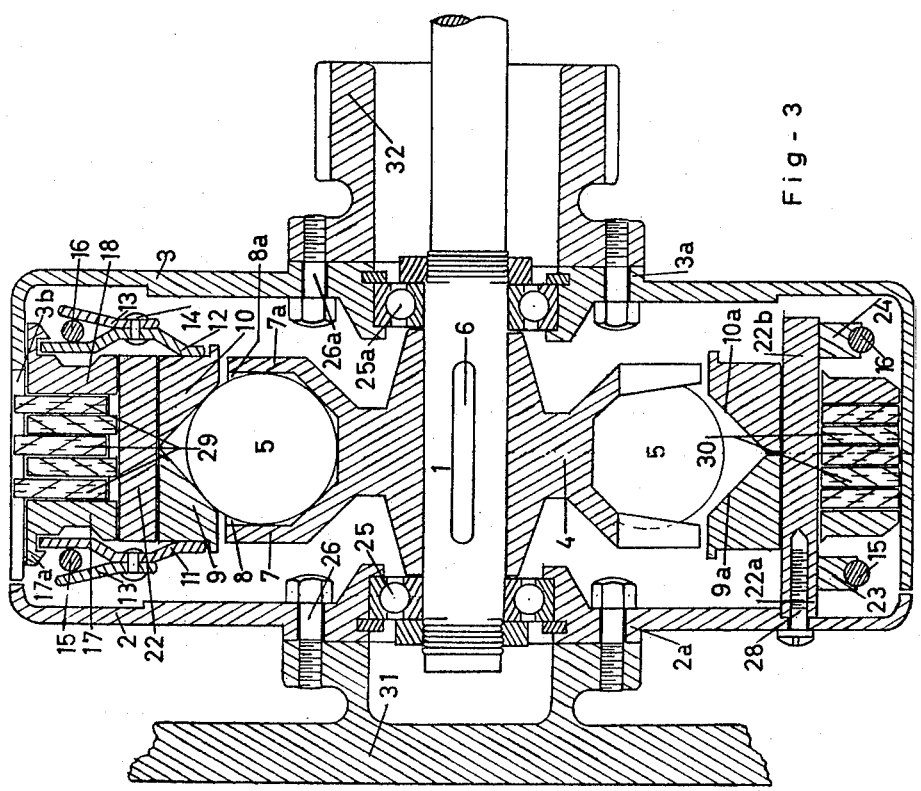
Fig. 3 is similar to Fig. 1, but with external connections showing the mechanism when used as a brake.

Since the engagement of the clutch drums 2 and 3 does not depend on their own speed, it is thus possible to employ this device also as a centrifugally actuated brake. Referring to Fig. 3, the coupling plate 2a is fixedly attached to a part of a structure 31 so as to hold the clutch drum 2 stationary, and the coupling plate 3a is fixedly secured to a gear wheel 32 whereby the clutch drum 3 may be rotated at any angular speed. Shaft 1 is extended to the right and connected to any suitable source of power (not shown). If shaft 1 and consequently the rotor 4 are rotated with sufficient speed, the friction discs 29 and 30 will be brought into frictional engagement, and clutch drum 3 will be restrained against rotation, the device now functioning as a brake.

Referring to Fig. 1 it will appear that the cross-sections of the cylindrical members 9 and 10 at the surfaces 9a and 10a are straight lines with a slope of 45 degrees. Other angles may be used, the greater the angle, the larger will be the axial components of force and consequently the engaging pressure of the friction discs 29 and 30. The cross-sections of the surfaces 9a and 10a are not necessarily straight lines, instead they may be curves which will provide different rates of engaging pressures.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

I claim:

In a device of the class described, the combination including a shaft to be driven by a source of power capable of accelerating at times said shaft above a predetermined minimum speed, an inner cylindrical part supported and freely rotatable about said shaft to be driven at any particular speed, a plurality of friction discs fastened to said inner rotatable part on its outer periphery, an outer cylindrical part supported and freely rotatable about said shaft to be driven at any other particular speed, a plurality of friction discs fastened to said outer rotatable part on its inner periphery and interleaved with the first-named friction discs, a pair of cylindrical sections, means fastening said cylindrical sections to the inner periphery of the inner cylindrical part for rotation therewith and including means permitting axial movement of said cylindrical sections, said cylindrical sections having a frusto-conical surface in the opposed surfaces of said sections constituting a pair of raceways, a pair of thrust rings disposed on opposite sides of said inner cylindrical part in a plane transverse to the axis of rotation, a plurality of plates circumferentially spaced about each of said thrust rings, each plate including a portion for bearing against the outermost disc of said interleaved discs and a further portion for bearing against the cylindrical section, means pivotally mounting said plates against said thrust rings so that said portion serves to cause engagement of the interleaved discs when the further portion is deviated by said cylindrical sections when the same are separated in axially outward direction, a number of springs corresponding to the number of said plates, each spring being fastened to each plate and operatively positioned on said thrust rings for normally disengaging said interleaved friction discs and for biasing said cylindrical sections together, a rotor secured to said shaft inside said inner cylindrical part and concentrically surrounded by said cylindrical sections, a plurality of spherical balls adapted to be carried for rotation by said rotor and said rotor having means allowing a limited amount of radial displacement of the balls therein, each of said spherical balls having an angular contact point with each of said frusto-conical surfaces constituting said raceways of said cylindrical sections when rolling upon the same, causing simultaneous opposite axail displacement in outward directions of said cylindrical sections when said shaft is accelerated above a predetermined minimum speed, whereby said inner and outer cylindrical parts are coupled together for rotation at a speed which will depend upon the speed-torque relations of both of said inner and outer cylindrical parts.

References Cited in the file of this patent

UNITED STATES PATENTS

| | | |
|---|---|---|
| 635,477 | Gunderson | Oct. 24, 1899 |
| 2,136,811 | Burtnett | Nov. 15, 1938 |
| 2,690,826 | Stelzel | Oct. 5, 1954 |